Figure 1:
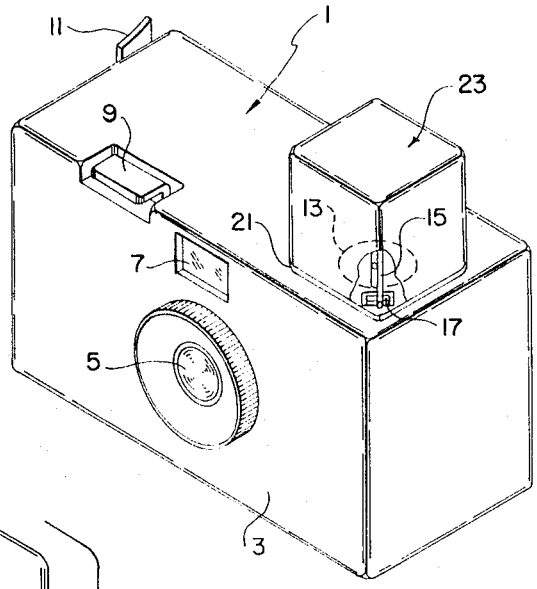
Figure 2:
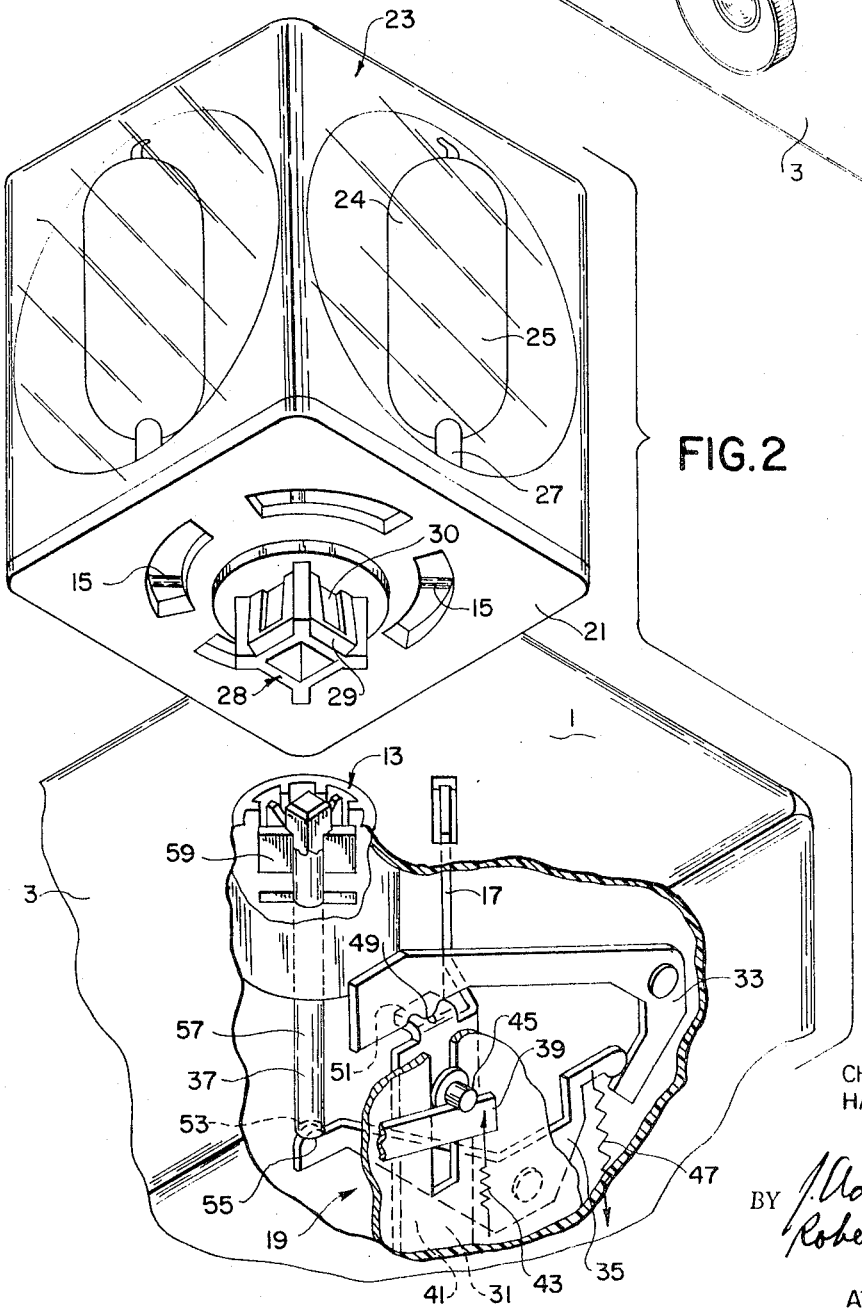
Figure 3:
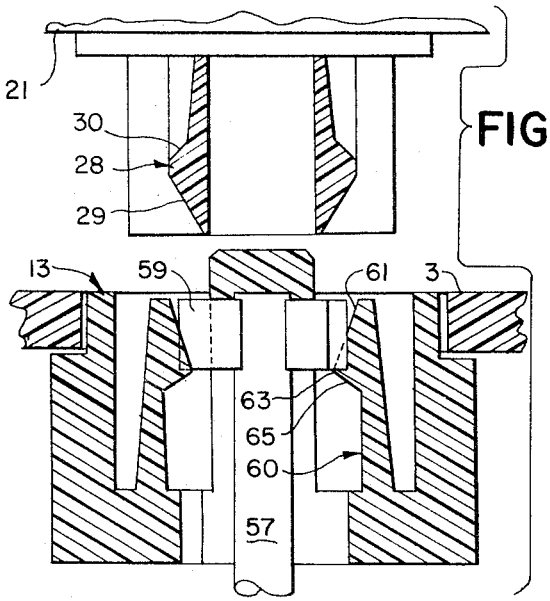
Figure 6:
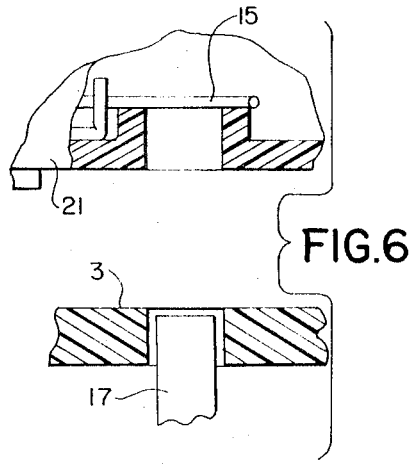
Figure 7:
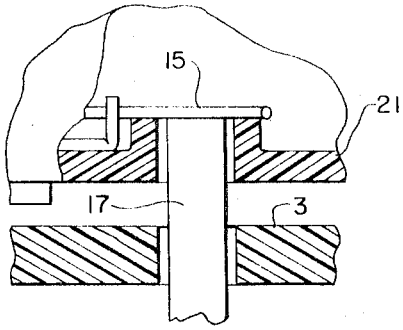
Figure 4:
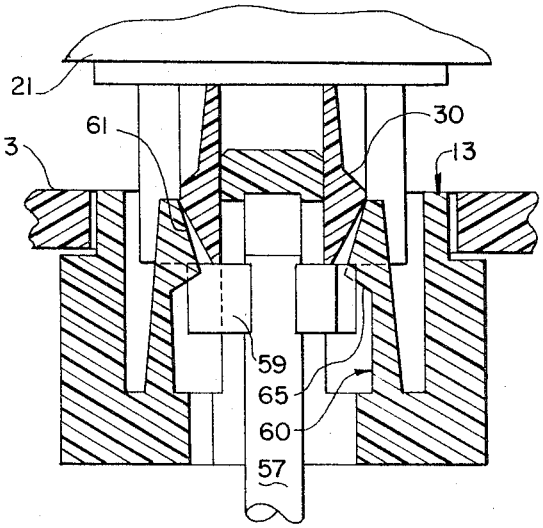
Figure 8:
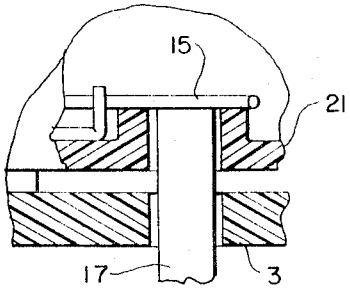
Figure 5:
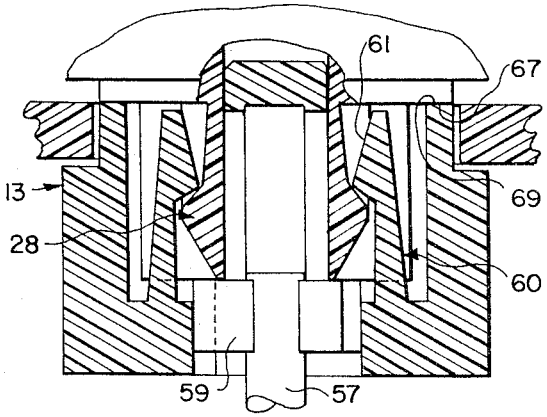

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1046

T887,020

APPARATUS AND SAFETY MECHANISM FOR USE WITH MECHANICALLY FIREABLE FLASH DEVICES

Chester W. Michatek and Harold L. Malone, both of 901 Elmgrove Road, Rochester, N.Y. 14650

Filed Mar. 30, 1970, Ser. No. 23,643

**Int. Cl. G03b *15/04***

U.S. Cl. 95—11.5R

2 Sheets Drawing. 13 Pages Specification

Photographic apparatus and a safety mechanism for preventing the accidental firing of a mechanically fireable flash device when the device is first positioned on the apparatus. The flash device includes a striker lodged in an energized position from which it is releasable by the apparatus to fire the device. The apparatus has a sensing and/or actuating member movable into non-releasing en-

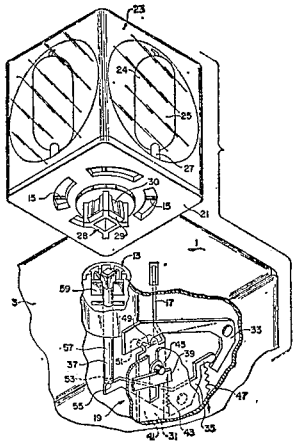

gagement with the striker in response to positioning of the device on the apparatus, and further includes mechanisms for preventing the accidental release of the striker during such movement of the member into engagement with the striker.

June 22, 1971 C. W. MICHATEK ET AL T887,020

APPARATUS AND SAFETY MECHANISM FOR USE WITH MECHANICALLY FIREABLE FLASH DEVICES

Filed March 30, 1970 2 Sheets-Sheet 1

CHESTER W. MICHATEK
HAROLD L. MALONE
INVENTORS

BY J. Addison Mathews
Robert W. Hampton

ATTORNEYS

CHESTER W. MICHATEK
HAROLD L. MALONE
INVENTORS

BY J. Addison Mathews
Robert W. Hampton

ATTORNEYS